United States Patent [19]
Kitamura et al.

[11] Patent Number: 5,026,605
[45] Date of Patent: Jun. 25, 1991

[54] COATED IRON CARBIDE FINE PARTICLES

[75] Inventors: Ikuo Kitamura, Kyoto; Hideki Aomi; Satoshi Koyama, both of Osaka; Katsushi Tokunaga, Habikino; Kazuo Okamura, Itami, all of Japan

[73] Assignee: Daikin Industries Ltd., Osaka, Japan

[21] Appl. No.: 343,649

[22] Filed: Apr. 27, 1989

[30] Foreign Application Priority Data

Apr. 28, 1988 [JP] Japan .................................. 63-105806

[51] Int. Cl.$^5$ .............................................. B32B 15/02
[52] U.S. Cl. ..................................... 428/403; 428/404; 252/62.55
[58] Field of Search ............... 428/403, 404, 900, 694; 252/62.51, 62.55, 62.56

[56] References Cited

U.S. PATENT DOCUMENTS

| | | | |
|---|---|---|---|
| 4,069,367 | 1/1978 | Umeki et al. | 428/403 |
| 4,227,928 | 10/1980 | Wang | 75/238 |
| 4,539,261 | 9/1985 | Nakata et al. | 428/403 |
| 4,668,414 | 5/1987 | Okamura et al. | 252/62.51 |
| 4,900,464 | 2/1990 | Arase et al. | 252/62.55 |

FOREIGN PATENT DOCUMENTS 63-17212  6/1988  Japan .

*Primary Examiner*—George F. Lesmes
*Assistant Examiner*—Christopher Brown
*Attorney, Agent, or Firm*—Armstrong, Nikaido, Marmelstein, Kubovcik & Murray

[57] ABSTRACT

Iron carbide fine particles which have a coating layer of at least one metal compound selected from the group consisting of copper compound and manganese compound.

1 Claim, No Drawings

COATED IRON CARBIDE FINE PARTICLES

The present invention relates to iron carbide fine particles and process for preparing the same.

It is known that acicular particles containing iron carbide are prepared by contacting acicular iron oxyhydroxide or acicular iron oxide with CO or a mixture of CO and $H_2$ at 250° to 400° C. and that the resulting particles are stable chemically, have a high coercive force and are useful as a magnetic material for magnetic recording media. (For example, refer to JP-A-Nos. 60-71509, 60-108309, 60-127212 and 60-155522. The term "JP-A" as used herein means an "unexamined published Japanese patent application".)

However, these methods have defects that the resulting iron carbide fine particles are low in coercive force.

An object of the invention is to provide a process for preparing iron carbide fine particles which are high in coercive force.

The above and other objects of the invention will become apparent from the following description.

The present invention provides iron carbide fine particles which have a coating layer of at least one metal compound selected from the group consisting of copper compound and manganese compound.

The present invention also provides a process for preparing iron carbide fine particles which comprises, (a) coating an iron compound selected from the group consisting of iron oxyhydroxide fine particles and iron oxide fine particles with at least one metal compound selected from the group consisting of copper compound and manganese compound, (b) optionally contacting the iron compound of the above (a) with a reducing agent which does not contain carbon atoms, and (c) contacting the iron compound of the above (b) with a reducing-and-carburizing agent containing carbon atoms or a mixture thereof with a reducing agent which does not contain carbon atoms.

Examples of preferred iron oxyhydroxides are α-FeOOH (goethite), β-FeOOH (akaganite) and γ-FeOOH (lepidocrosite). Examples of preferred iron oxides are α-$Fe_2O_3$ (hematite), γ-$Fe_2O_3$ (maghemite) and $Fe_3O_4$ (magnetite).

α-$Fe_2O_3$ or γ-$Fe_2O_3$ is, for example, any of one prepared by heating α-FeOOH, β-FeOOH or γ-FeOOH at about 200° to about 350° C., followed by dehydration, α-$Fe_2O_3$ or γ-$Fe_2O_3$ prepared by heating the resulting product further at about 350° to about 900° C. to compact the crystals, and others. β-FeOOH is preferably treated with an aqueous solution of alkaline compound.

The above-mentioned $Fe_3O_4$ can be prepared by contacting an iron oxide other than $Fe_3O_4$ or iron oxyhydroxide with a reducing-and-carburizing agent containing carbon atoms or a reducing agent which does not contain carbon atoms, or a mixture thereof, although the $Fe_3O_4$ is not limited to one prepared in those methods. When a reducing-and-carburizing agent containing carbon atoms or a mixture thereof with a reducing agent which does not contain carbon atoms, is contacted with an iron oxyhydroxide or iron oxide other than $Fe_3O_4$ to prepare $Fe_3O_4$, the same contact conditions as those in the process (c) of the invention can also be employed except for the time condition. In this case, the $Fe_3O_4$ formed can be subsequently held in contact with the gas under the same conditions as in the preceding reaction without any interruption to obtain the desired particles of the invention.

The starting iron oxyhydroxides or iron oxides can be those at least 3, preferably 3 to 20, in average axial ratio and having an average particle size (long axis) of up to 2 μm, preferably 0.1 to 2 μm, most preferably 0.1 to 1.0μm. As will be described later, the particles produced are slightly smaller than, but almost unchanged from, the starting material in average axial ratio and in average particle size, so that the particles of the invention in general preferably have such sizes as already stated.

The iron oxyhydroxide or iron oxide to be used for the process for producing particles according to the invention may have added thereto a small amount or small amounts of a compound, such as oxide or carbonate of copper, magnesium, manganese or nickel; silicon oxide; potassium salt, sodium salt, etc., insofar as the starting material chiefly comprises an iron oxyhydroxide or iron oxide.

The starting iron oxyhydroxide preferably has a pH of at least 5 on the surface thereof as disclosed in JP-A-No. 60-108309. In this case are produced particles having a higher coercive force. The starting iron oxyhydroxide having a pH of less than 5 can be used after it is increased to at least 5 in pH by contact with an aqueous solution of an alkali compound (e.g., sodium hydroxide, potassium hydroxide, ammonium hydroxide). Further, alkali-treated iron oxide can also be used. The starting material can be treated with an alkaline compound by contacting the material with an aqueous solution of sodium hydroxide, potassium hydroxide, ammonium hydroxide and like alkaline compound (e.g., with an aqueous solution having a pH of at least 8, preferably at least 10), stirring for 30 minutes to 1 hour when required, filtering the mixture and drying.

In the present invention, the surface pH is defined as a value which is obtained by boiling 5 g of a sample in 100 cc of distilled water for one hour, cooling the solution to room temperature, allowed to stand for one hour and measuring a pH of the resulting supernatant with a pH meter.

In the present invention, the above iron oxyhydroxide or iron oxide (hereinafter both compounds may be referred to as "iron compound") is coated with at least one metal compound selected from the group consisting of copper compound and manganese compound.

Copper compounds include copper (II) sulfate, copper nitrate, copper (II) chloride, copper (II) bromide and copper acetate. Manganese compounds include manganese sulfate, manganese nitrate, manganese chloride and manganese bromide.

Each of these metal compounds can be coated on the surface of the iron compound, for example, by adding an aqueous solution of the above metal compound to a dispersion of the iron compound and then neutralizing the mixture. The filtration and drying are required after the neutralization in the coating step. The amount for coating of the metal compounds is 0.01 to 10%, preferably 0.05 to 5% by weight in terms of the metal element based on the weight of the iron oxyhydroxide or iron oxide in terms of $Fe_2O_3$. Then the obtained iron compound fine particles are brought into contact reaction.

Iron carbide fine particles of the present invention are coated with the metal compound in an amount of 0.01 to 10%, preferably 0.05 to 5% by weight in terms of the metal element based on the weight of the iron carbide in terms of $Fe_2O_3$.

In the invention, typical examples of the reducing agent which does not contain carbon atoms are $H_2$, $NH_2NH_2$, etc.

As the reducing-and-carburizing agent containing carbon atoms, at least one of the following compounds can be used.

① CO

② aliphatic, linear or cyclic, saturated or unsaturated hydrocarbons such as methane, propane, butane, cyclohexane, methylcyclohexane, acetylene, ethylene, propylene, butadiene, isoprene, town gas, etc.

③ aromatic hydrocarbons such as benzene, toluene, xylene, alkylated or alkenylated derivatives thereof having a boiling point up to 150° C.

④ aliphatic alcohols such as methanol, ethanol, propanol, cyclohexanol, etc.

⑤ esters such as methyl formate, ethyl acetate and like ester having a boiling point up to 150° C.

⑥ ethers such as lower alkyl ether, vinyl ether and like ether having a boiling point up to 150° C.

⑦ aldehydes such as formaldehyde, acetaldehyde and like aldehyde having a boiling point up to 150° C.

⑧ ketones such as acetone, methyl ethyl ketone, methyl isobutyl ketone and like ketone having a boiling point up to 150° C.

Particularly preferable reducing-and-carburizing agent containing carbon atoms are CO, $CH_3OH$, $HCOOCH_3$, saturated or unsaturated aliphatic hydrocarbons having 1 to 5 carbon atoms.

In the process (b) of the invention, the reducing agent which does not contain carbon atoms can be used as it is or as diluted. Examples of diluents are $N_2$, $CO_2$, argon, helium, etc. The dilution ratio is suitably selected but is preferably up to about 10 times (by volume). The contacting temperature, contacting time, gas flow rate and other conditions depend, for example, on the production history, average axial ratio, average particle size and specific surface area of the iron compound. The preferred contacting temperature is about 200° to about 700° C., preferably about 300° to about 400° C. The preferred contacting time is about 0.5 to about 6 hours. The preferred gas flow rate is about 1 to about 1000 ml S.T.P./min per gram of the starting iron compound. The contacting pressure inclusive of that of the diluent is usually 1 to 2 atom. although not particularly limitative.

In the process (c) of the invention, the reducing-and-carburizing agent containing carbon atoms or a mixture thereof with the reducing agent which does not contain carbon atoms can be used as it is or as diluted. When the mixture is used, the mixing ratio of the reducing-and-carburizing agent to the reducing agent is suitably selected but is preferably up to 1/5 by volume. Contact conditions are also suitably selected but the preferred contacting temperature is about 250° to about 400° C., more preferably about 300° to about 400° C. The preferred contacting time is about 0.5 to 6 hours when the contact in (b) is conducted, and about 1 to about 12 hours when the contact in (b) is not conducted. The preferred gas flow rate is about 1 to about 1000 ml S.T.P./min per gram of the starting iron compound. The contacting pressure inclusive of that of the diluent is usually 1 to 2 atom. although not particularly limitative.

The particles obtained by the present invention are in the form of generally uniform particles when observed under an electron microscope. The particles are present as primary particles and have the same particulate form as the starting particles of iron oxide. The particles obtained by the process are found to contain carbon by elementary analysis and to contain an iron carbide by its X-ray diffraction pattern, which exhibits plane spacings at 2.28Å, 2.20Å, 2.08Å, 2.05Å and 1.92Å. Such pattern corresponds to $Fe_5C_2$. The iron carbide component of the present invention chiefly comprises $Fe_5C_2$, with $Fe_2C$, $Fe_{20}C_9$ ($Fe_{2.2}C$), $Fe_3C$, etc. present conjointly therewith in some cases. It is suitable to represent the iron carbide as $Fe_xC$ ($2 \geq X < 3$).

The iron carbide fine particles of the present invention are useful as a magnetic material for magnetic recording as is apparent from the foregoing characteristics, etc., while the use thereof is not limited thereto. For example, the particulate material is usable as a catalyst for preparing lower aliphatic hydrocarbons from CO and $H_2$.

In the present invention, it is possible to produce iron carbide fine particles which are high in coercive force. For example, iron carbide fine particles obtained by contacting the conventional goethite particles with CO at 380° C. for 3 hours have coercive force of 800 Oe. Iron carbide fine particles obtained in the same manner as above except that the goethite particles coated with copper compound or manganese compound are used have coercive force of 840 Oe.

The invention will be described below in detail by showing reference examples, examples and comparison examples.

In the following examples, characteristics, etc. are determined in the methods described below.

(1) Magnetic characteristics.

Determined in the following method unless otherwise specified.

Coercive force (Hc, Oe), saturation magnetization ($\sigma s$, e.m.u./g) and square ratio (Sq) are measured in a magnetic field with a strength of 5 kOe, using a gauss meter equipped with a Hall-effect element and the sample with a packing ratio of 0.2.

(2) Elementary analysis for C, H and N

The sample is subjected to elementary analysis in the conventional method using MT2 CHN CORDER Yanaco, Yanagimoto Mfg. Co., Ltd, with passage of oxygen (helium carrier) at 900° C.

REFERENCE EXAMPLE 1

Eight grams (7.2 g in terms of $Fe_2O_3$) of goethite particles, 0.5 μm in average particle size and 12 in average axial ratio, were dispersed in 0.5 of pure water. The dispersion was adjusted to pH 5 with an aqueous solution of 1N-HCl and thereto was added a specific amount of the coated metal compound listed in Table 1. The mixture was stirred and adjusted to pH 9.0 with 1N-NaOH to perform the coating of the metal compound. The particles were washed with water, filtered and dried to obtain goethite particles coated with the metal compound.

REFERENCE EXAMPLE 2

The goethite particles obtained in Reference Example 1 were heated and dehydrated in air at 500° C. for 30 minutes to obtain $\alpha$-$Fe_2O_3$ which was coated with the metal compound.

EXAMPLES 1 AND 2

Two grams of each of the goethite particles or $\alpha$-$Fe_2O_3$ particles obtained in Reference Example 1 or 2 were contacted with CO at 380° C. for 3 hours at a flow rate of 500 ml/min. The particles were thereafter allowed to cool to room temperature to obtain a black powder.

The X-ray diffraction pattern of the product matched that of $Fe_5C_2$ Iron Carbide on ASTM X-Ray Powder Data File 20-509. The magnetic characteristics were given in Table 2.

REFERENCE EXAMPLE 3

Goethite particles coated with manganese compound were obtained in the same manner as in Reference Example 1 except that 0.9 g of manganese chloride was used in place of copper chloride.

REFERENCE EXAMPLE 4

The goethite particles obtained in Reference Example 3 were heated in air at 500° C. for 30 minutes to obtain $\alpha$-$Fe_2O_3$ particles.

EXAMPLES 3 AND 4

Two grams of each of goethite particles or $\alpha$-$Fe_2O_3$ particles prepared in Reference Example 3 or 4 was contacted with CO at 380° C. for 3 hours at a flow rate of 500 ml/min. The particles were thereafter allowed to cool to room temperature to obtain a black powder.

COMPARISON EXAMPLE 1

A black powder was obtained in the same manner as in Example 1 with the exception of using goethite particles which are not coated with metal compound.

COMPARISON EXAMPLE 2

A black powder was obtained in the same manner as in Example 2 except that the coating of metal compound is omitted.

TABLE 1

| Ref. Ex. | coated metal compound kind | amount (g) (in terms of metal element) | dehydration (*1) | coated starting iron compound |
|---|---|---|---|---|
| 1 | cupric chloride ($CuCl_2.2H_2O$) | 0.04 (0.010) | X | goethite particles coated with Cu compound |
| 2 | cupric chloride ($CuCl_2.2H_2O$) | 0.04 (0.010) | O | $\alpha$-$Fe_2O_3$ particles coated with Cu compound |
| 3 | manganese chloride ($MnCl_2.4H_2O$) | 0.9 (0.250) | X | goethite particles coated with Mn compound |
| 4 | manganese chloride ($MnCl_2.4H_2O$) | 0.9 (0.250) | O | $\alpha$-$Fe_2O_3$ particles coated with Mn compound |

(*1) O: goethite particles are dehydrated
X: goethite particles are not dehydrated

TABLE 2

| | iron compound | coated metal | coated amount (wt %) | Hc (Oe) | $\sigma s$ (emu/g) | Sq |
|---|---|---|---|---|---|---|
| Ex. 1 | $\alpha$-FeOOH | Cu | 0.14 | 840 | 95 | 0.50 |
| 2 | $\alpha$-$Fe_2O_3$ | Cu | 0.14 | 830 | 89 | 0.52 |
| 3 | $\alpha$-FeOOH | Mn | 3.47 | 840 | 92 | 0.51 |
| 4 | $\alpha$-$Fe_2O_3$ | Mn | 3.47 | 830 | 86 | 0.51 |
| Com. Ex. 1 | $\alpha$-FeOOH | none | — | 800 | 100 | 0.49 |
| 2 | $\alpha$-$Fe_2O_3$ | none | — | 780 | 98 | 0.50 |

We claim:
1. Iron carbide fine particles which have a coating layer of at least one metal compound selected from the group consisting of copper compound and manganese compound wherein the coated amount of said metal compound is 0.01 to 10% by weight in terms of the metal element based on the weight of the iron carbide in terms of $Fe_2O_3$.

* * * * *